June 13, 1950 F. V. SCHULTZ 2,511,014

DIVERSITY RECEIVING COMBINATION

Filed June 19, 1944 2 Sheets-Sheet 1

INVENTOR.
FLOYD V. SCHULTZ

BY William D. Hall
ATTORNEY

June 13, 1950 F. V. SCHULTZ 2,511,014

DIVERSITY RECEIVING COMBINATION

Filed June 19, 1944 2 Sheets-Sheet 2

INVENTOR.
FLOYD V. SCHULTZ

BY William D. Hall
ATTORNEY

Patented June 13, 1950 2,511,014

UNITED STATES PATENT OFFICE 2,511,014

DIVERSITY RECEIVING COMBINATION

Floyd V. Schultz, Dayton, Ohio

Application June 19, 1944, Serial No. 541,081

4 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to radio receiving circuits, and more particularly, to a system for reducing distortion resulting from the phenomenon of selective fading.

The phenomenon of selective fading was noted a number of years ago, and it is now well understood that the effect is caused by the fact that the received sky wave and ground wave have nearly equal amplitudes. When 180° out of phase they tend to cancel each other. Due to the fact that the two paths are many wavelengths long, the phase angle between the two waves will vary rapidly with frequency, and the two will cancel over a very narrow frequency band. If this narrow band happens to include the carrier, the excessive distortion which is so common results. While A. V. C. tends to compensate for loss of volume due to fading, the loss of the carrier results in distortion.

Since the distortion is due to the fading of the carrier, it would seem desirable to provide some means at the receiver for resupplying the carrier. However, practical considerations prohibit the use of a local oscillator for this purpose since, with double side band transmission, the locally supplied carrier would not only have to be of exactly the same frequency as the carrier at the transmitter but also would need to have substantially the same phase with respect to the side bands.

With a knowledge of these problems in the prior art, I have, as an object of my invention, the provision at the receiver of means for increasing the amplification of the carrier more than that of the side bands in order that even during selective fading, there exists sufficient carrier at the detector to reduce or prevent distortion.

It is another object of my invention to apply these principles to a superheterodyne receiver so that during normal reception, the carrier, due to amplification in excess of that of the side bands, will not adversely affect the operation or output of the audio detector, since such audio detector is linear and its operation is independent of the strength of the carrier and depends only on the strength of the side bands so long as sufficient carrier exists to cause correct demodulation.

It is a further object of my invention to provide a receiver which will discriminate in its amplification in favor of the carrier over the side bands prior to separation of the audio frequencies thereof, and thereby reduces or eliminates distortion due to selective fading.

Other objects and advantages of my invention will appear in the following specification and accompanying drawings, and the novel features thereof will be particularly pointed out in the annexed claims.

Figure 1:
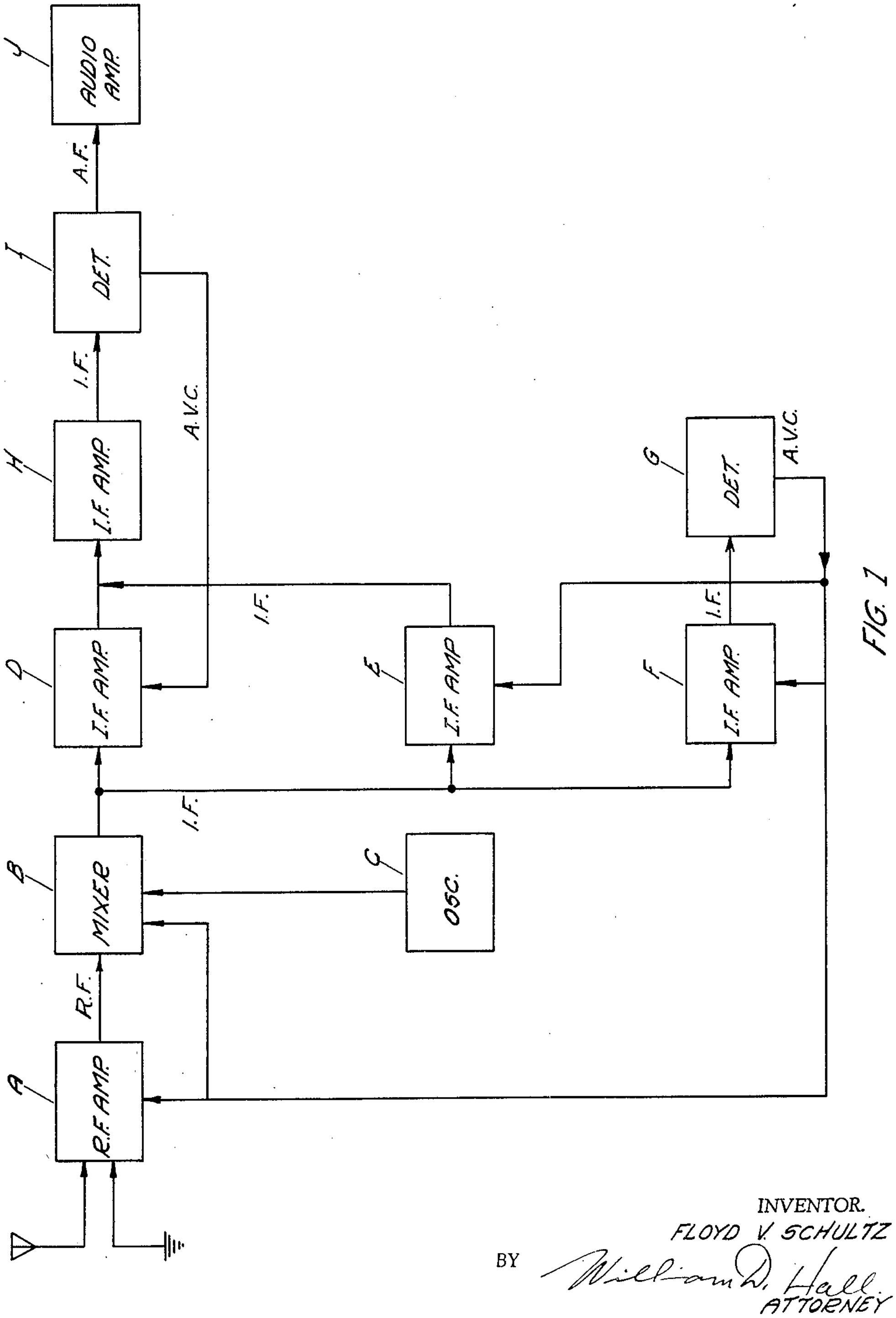
Fig. 1 is a block diagram of one form of my invention applied to a superheterodyne receiving system.

Referring to the drawings in detail and, particularly, to Fig. 1, A represents a conventional R. F. amplifier of a superheterodyne receiver, C represents a local oscillator which beats the R. F. impressed upon the conventional mixer B down to the usual I. F. The output of the mixer B is fed to the three intermediate frequency amplifiers D, E and F, which are connected in parallel to the output of the mixer B. Amplifiers E and F may be conventional, whereas amplifier D has four stages of I. F. amplification and, in addition, contains a very sensitive crystal filter. Amplifier E has one stage of I. F. amplification and connects into the input of the last stage of intermediate frequency amplifier H in parallel with the amplifiers of channel D, and furnishes the audio detector I with the side bands and, under normal reception conditions, the carrier. Amplifier branch D has much higher gain than amplifier E and, due to the action of the crystal filter contained therein, passes only a very narrow frequency band including the carrier and next adjacent side bands. When combined with the output of the amplifier E, its output is passed through the last I. F. stage H and into the input of audio detector I, which furnishes the audio output and feeds into a conventional audio amplifier J. From the detector I is derived the automatic volume control voltage for the four stages in the I. F. amplifier D.

The channel, consisting of R. F. amplifier A, mixer B, I. F. amplifier E and I. F. amplifier H, has much lower gain than the channel comprising R. F. amplifier A, the mixer B, I. F. amplifiers D and the I. F. amplifier H. The automatic volume control voltage derived from the audio detector I is led back and applied to the control grids of the tubes in the I. F. channel D, but does not affect or control the tubes or operation of the circuits of channel E. Therefore, in order to control the volume and operation of circuits of E, A, and B, I. F. amplifier F and detector G are employed to bias the grids of the tubes therein and provide automatic volume control. Since the channel F gives the same gain as channel E and amplifier H, detector G gives the same automatic volume control voltage as would detector I with amplifiers D rendered inoperative or ineffective. However, amplifier F cannot be eliminated and a fraction of the control voltage derived from detector I cannot be applied to the amplifiers now controlled by amplifier F since the ratio between the diode currents of detectors I and G is not constant, such as would be required to permit this change. The I. F. amplifier D contains a crystal filter, to be described in detail hereinafter, which will permit only the carrier and next adjacent side bands to pass through amplifier channel D, and thus raise the carrier to such level at detector I that even during selective fading of the carrier, distortion will be prevented. In order to accomplish this, the crystal filter should be made extremely selective with a very appreciable attenuation for adjacent frequencies at or near 30 cycles from its resonant frequency and, of course, for frequencies beyond that point. Due to this selectivity, care should be exercised in tuning the local oscillator so that the intermediate frequency shall differ by preferably only a few cycles from the resonant frequency of the crystal filter.

When the local oscillator is tuned so that the intermediate frequency carrier does not coincide with the resonant frequency of the crystal, the carrier furnished by amplifier D will be reduced in magnitude and, further, the crystal may introduce some phase shift in the carrier wave furnished by amplifier D. This is largely overcome by careful tuning of the local oscillator. Since most of the side band energy passes through amplifier E, which is reasonably broad, slight detuning of the carrier will not cause an appreciable phase shift of the side bands.

Drift in the carrier frequency is largely obviated by the use of an electron coupled oscillator and a Hartley circuit, as described more in detail hereinafter, and a buffer amplifier can be placed between the local oscillator and the mixer to prevent reaction on the oscillator as the automatic volume control voltage of the mixer is varied. In addition, a separate voltage supply may be used on the oscillator and buffer amplifier. For accurate tuning, a micro-ammeter may be used in the load resistor circuit of the audio detector I.

Figure 2:
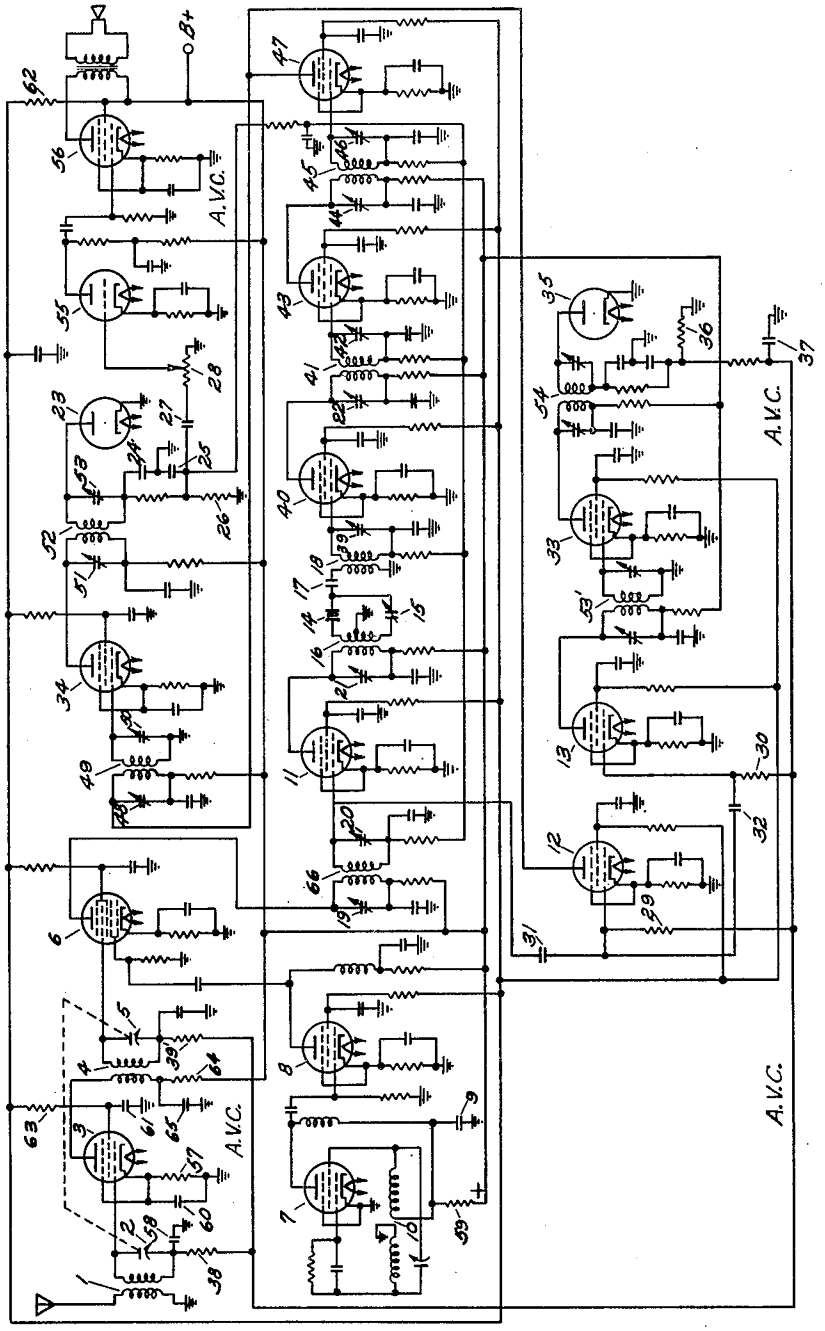
Fig. 2 is a detailed circuit diagram of a form of the same embodiment of my invention.

Referring to one form of my invention set forth in the detailed circuit of Fig. 2, the conventional antenna and ground feed into the standard high inductance primary of the usual antenna coupling transformer 1. The secondary of transformer 1 is made to resonate with a tuning condenser 2, which is ganged with condenser 5 for manual tuning purposes. The circuit feeds into the control grid of a pentode 3 and these elements constitute a stage of R. F. amplification. The bias for tube 3 is supplied to its control grid by the drop in resistor 57 located in the cathode circuit, which resistor is shunted by condenser 60 to bypass the R. F. to ground. The screen grid is R.-F. grounded through condenser 61 and supplied through resistors 62 and 63 from the main B voltage source of supply. Resistor 63 and condenser 61 serve as a filter to keep the R. F. out of the B supply. Likewise, the condenser 58 and resistor 38 serve to keep the R. F. out of the A. V. C. circuit. The plate circuit of tube 3 feeds into one side of the primary of the standard high inductance R.-F. transformer 4, and the other side of such transformer is connected to the B supply through the resistor 64, which, together with the by-passing effect of condenser 65, keeps R. F. out of the B supply.

Connected across the secondary of R.-F. transformer 4 and adapted to resonate with it, is a variable condenser 5 ganged with condenser 2 for tuning. This circuit feeds into the signal grid of tube 6 which is preferably a 6A7 tube and which serves as a mixer or first detector. Instead of using the first two grids of tube 6 as a local oscillator, they are connected together and serve as injector grids.

A separate oscillator 7 is connected through buffer amplifier 8 to the injector grids of tube 6, which serves to improve frequency stability, as A. V. C. is applied to the signal grid of tube 5 through resistor 39, in a manner to be described more in detail hereinafter. The oscillator in question is of the series-fed type and condenser 9 acting with resistor 59 keeps R. F. from getting back into the B supply. The inductance coil 10 of the tank circuit is broken to keep the B supply off the control grid of tube 7. The condenser 9 serves to couple the two parts of coil 10 and complete the tank circuit. Tube 7 is electron coupled from the screen grid to the plate. Screen grid and the controd grid of oscillator tube 7 function as a triode oscillator. Electrons will, therefore, pass through the screen grid to the plate in spurts creating the electron coupling. Interposed between the oscillator tube 7 and the mixer 6 is a buffer amplifier 8 in the form of a pentode tube inductively coupled to the oscillator 7 and mixer 6 in a conventional manner. The usual condenser-resistance filter is used on the screen grid thereof to by-pass or block out R. F. from the B supply, as previously described. The plate of the mixer tube 6 feeds through I. F. transformer 66, whose windings are tuned to resonance with condensers 19 and 20, and which are preferably pretuned to resonate at the standard 456 kc. frequency. The secondary of this transformer then feeds the control grids of the tubes, preferably pentodes, 11, 12 and 13, which are in separate parallel paths or channels. In path D the first I. F. stage 11 feeds into the primary of I. F. transformer 16, pretuned to the desired resonant frequency by condenser 21. The secondary of transformer 16 forms part of a crystal filter which, at a frequency of 456 kc., will pass a band of about plus or minus 100 cycles. Crystal 14, condenser 15 and tapped secondary of transformer 16 make a balanced bridge circuit for frequencies, except at or near the resonant frequency of the crystal, and no current will flow or energy pass except at or near the crystal frequency. Condenser 17 is used to create series resonance with the primary of I. F. transformer 18 to increase gain of the amplifier at I. F. frequency. As previously suggested, condensers 19, 20, 21, 39, 22, 42, 44, 46, 48, 50, 51 and 53 are preset condensers for tuning the I. F. circuits to resonance at the desired frequency.

Path D has four stages of I. F. for amplifying the carrier and immediately adjacent side bands which correspond to the low audio frequencies. Consequently, the total amplification is very high, comparatively speaking. This path feeds into I. F. amplifier 34 which, in turn, feeds into the conventional diode audio detector 23 for demodulating the I. F. and separating the audible signal and, further, for supplying the necessary negative bias for A. V. C.

Condensers 24 and 25, together with their associated resistor, form a π filter for by-passing I. F. around the diode load resistor 26. The audio voltages of 10 kc. or less will not pass through condensers 24, 25, as their capacity is too low. Audio of about 10 kc. or less will flow through paths containing elements 27, 28 and 26, creating a voltage drop. Condenser 27 blocks out D. C. from the path of resistor 28 and the variations passed by the condensers reflect changes in drop across variable resistor 28, and thus changes the grid bias or potential on the audio stages 55, 56, and the signal is passed through these stages, of conventional type, in the usual manner. Resistor 28 serves also as a manual volume control. The drop across resistor 26 influences the grid bias of the four amplifiers in channel or path D to change the gain.

Path E contains no crystal filter so that it passes both the carrier and side bands through pentode I. F. amplifier tube 12, feeding it to the I. F. amplifier 34 through I. F. transformer 49, which is connected in common with paths D and E. Path E serves also to by-pass energy around path D and provide less amplification than that path.

Resistors 29 and 30 are grid resistors and are provided to permit of application of A. V. C. differently to tubes 11, 12 and 13. Condensers 31 and 32 act as blocking condensers to electrically separate the bias for tubes 11, 12 and 13. Condenser 32 and resistor 30, in this circuit, may be omitted and the control grids of tubes 12 and 13 tied together, since the same A. V. C. is applied to both grids.

A. V. C. acts under the control of diode 23 on the tubes of channel D during fading to raise the level of the remaining part of the carrier and adjacent side bands in order to partially restore them. The carrier largely determines drop across load resistor 26. If this A. V. C. were applied directly to R. F. amplifier 3, mixer 6, and I. F. amplifier 12, the gain of these stages would normally be so low that practically no side band energy would be present at audio detector 23. Therefore, tubes 3, 6 and 12 must be given different A. V. C. treatment. If channel D were omitted, the correct bias would be developed across load resistor 26 for tubes 3, 6 and 12 but, since channel D must be present, a third channel F is provided along with another diode detector A. V. C. circuit G to accomplish the desired result.

In channel or path F, tube 13 serves the same office as tube 12 of channel E. Likewise, tube 33 serves the same purpose as common I. F. amplifier tube 34 and, from the A. V. C. standpoint, tube 35 serves the same purpose as detector 23. Therefore, the same voltage appears across resistor 36 as would appear across resistor 26 had the stages of path or channel D been eliminated. Resistors 29 and 30 are preferably identical to give the tube 13 the same output as tube 12. Resistors 29 and 30 would have to be present to keep I. F. on the grids of tubes 12 and 13 and from being by-passed to ground through condenser 37. Resistors 38 and 39' are to keep R. F. out of A. V. C. line which serves tubes 3 and 6.

During selective fading, the A. V. C. voltage which appears across resistor 36 will decrease due to the reduction of the carrier which will increase gain by tubes 3, 6 and 12. This will result in an increase of the more remote side bands appearing at detector 23. At the same time, the A. V. C. voltage appearing across resistor 26 will decrease resulting in an increase in gain of all I. F. amplifiers in path D, but will not affect the amplifier H. The increase in gain in channel D will be proportionately greater than that in channel E. Therefore, the ratio of carrier energy amplification to side energy amplification at detector 23 will be much greaterthan the normal signal input, and distortion due to loss of carrier in selective fading is reduced.

While the foregoing represents one embodiment of the invention, it is not to be construed as limiting the scope of this invention to the details of said embodiment, since I expressly recognize that it may take many other forms and, therefore, the attached claims alone will serve as the measure of such invention.

Having thus described my invention, I claim:

1. A radio receiving system of the character described comprising a stage of radio frequency amplification, a local oscillator, a mixer fed by said stage and said oscillator, three channels fed by said mixer, the first of said channels amplifying and passing the carrier, the second of said channels amplifying and passing the carrier and side bands and having less amplifying capacity than said first channel, the third channel amplifying and passing the carrier and side bands, means for combining the outputs of said first two channels and for detecting and separating the audio frequencies, means coupled to said last means and responsive to reduction in carrier level for increasing the amplification in said first channel to restore the carrier, and means coupled to said third channel and responsive to the signal level therein for controlling the amplification in the second and third channels.

2. A radio receiving system of the character described comprising a stage of radio frequency amplification, a local oscillator, a mixer fed by said stage and said oscillator, three channels fed by said mixer, the first of said channels amplifying and passing the carrier, the second of said channels amplifying and passing the carrier and side bands and having less amplifying capacity than said first channel, the third channel amplifying and passing the carrier and side bands, means for combining the outputs of said first two channels and for detecting and separating the audio frequencies, means coupled to said last means and responsive to reduction in carrier level for increasing the amplification in said first channel to restore the carrier, and means coupled to said third channel and responsive to the signal level therein for controlling the response of the radio frequency stage, mixer, and second and third channels.

3. A radio receiving system for modulated carrier waves comprising three channels fed by said waves in parallel, the first of said channels amplifying and passing substantially only the carrier component of said waves, the second and third of said channels amplifying and passing the carrier and side band components of said waves, a circuit for combining the outputs of said first two channels, a demodulator fed by the output of said circuit, means coupled to said circuit and responsive to reduction in energy level therein for increasing the amplification only in said first channel, and means coupled to said third channel and responsive to the signal level therein for reducing amplitude deviations of the energy fed to said three channels.

4. A radio receiving system for modulated carrier waves comprising a frequency changer, three channels fed in parallel by said frequency changer, the first of said channels amplifying and passing substantially only the carrier component of said waves, the second and third of said channels amplifying and passing the carrier and side bands and having less amplifying capacity than said first channel, a circuit for combining the outputs of said first two channels, demodulating means fed by said circuit, means coupled to said last means and responsive to reduction in the energy level therein for increasing the amplification in only said first channel, and means coupled to said third channel and responsive to the signal level therein for controlling the gain of said frequency changer and said second and third channels.

FLOYD V. SCHULTZ.

REFERENCES CITED

The following references are of record in the file of this patent:

UNITED STATES PATENTS

| Number | Name | Date |
|---|---|---|
| 2,027,022 | Conklin | Jan. 7, 1936 |
| 2,054,892 | Braden | Sept. 22, 1936 |
| 2,206,010 | Braselton | July 2, 1940 |
| 2,243,141 | Weagant | May 27, 1941 |
| 2,236,497 | Beers | Apr. 1, 1941 |
| 2,305,917 | Beers | Dec. 22, 1942 |